United States Patent
Lin

(10) Patent No.: US 9,563,706 B2
(45) Date of Patent: *Feb. 7, 2017

(54) IMAGE SEARCH APPARATUS AND METHODS THEREOF

(71) Applicant: Alibaba Group Holding Limited, Grand Cayman (KY)

(72) Inventor: Xuanyin Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,439

(22) Filed: Apr. 2, 2014

(65) Prior Publication Data

US 2014/0214792 A1 Jul. 31, 2014

Related U.S. Application Data

(63) Continuation of application No. 12/663,743, filed as application No. PCT/US2009/064210 on Nov. 12, 2009, now Pat. No. 8,738,630.

(30) Foreign Application Priority Data

Nov. 26, 2008 (CN) .......................... 2008 1 0173071

(51) Int. Cl.
*G06F 17/30* (2006.01)
*G06Q 30/06* (2012.01)

(52) U.S. Cl.
CPC ... *G06F 17/30864* (2013.01); *G06F 17/30265* (2013.01); *G06Q 30/0643* (2013.01)

(58) Field of Classification Search
CPC .................... G06F 17/30864; G06F 17/30321; G06F 17/30613; G06F 17/30961; G06F 17/30067

(Continued)

(56) References Cited

U.S. PATENT DOCUMENTS 6,175,841 B1 * 1/2001 Loiacono ...................... 715/205
6,499,016 B1 * 12/2002 Anderson ..................... 704/275

(Continued)

FOREIGN PATENT DOCUMENTS

JP 2003067147 3/2003
JP 2003256428 9/2003

(Continued)

OTHER PUBLICATIONS

Translation of Chinese Office Action from corresponding Chinese Patent Application No. 2008101730716, 33 pages.

(Continued)

*Primary Examiner* — Cam-Y Truong
(74) *Attorney, Agent, or Firm* — Lee & Hayes, PLLC

(57) ABSTRACT

Embodiments of a method and apparatus of image search are provided. An exemplary method of image search includes: receiving a request and returning a web page, where the returned web page allows uploading an image and adding annotation content for the image; receiving and storing the image and the annotation content for the image; and providing the annotation content for the image as a search index to an image search engine. Using the disclosed method and server, more searches related to information in an image can be provided. Moreover, because more information related to merchandise in an image can be provided to a viewer, it is believed that more online transactions can be facilitated.

12 Claims, 10 Drawing Sheets

(58) Field of Classification Search
USPC .................................................... 707/741
See application file for complete search history.

(56) References Cited

U.S. PATENT DOCUMENTS

| | | | |
|---|---|---|---|
| 7,043,472 B2* | 5/2006 | Aridor | G06F 17/30235 |
| 7,222,090 B2 | 5/2007 | Oddo | |
| 8,121,902 B1* | 2/2012 | Desjardins et al. | 705/26.1 |
| 8,429,232 B1* | 4/2013 | Appenzeller | H04L 51/12 709/206 |
| 2002/0071677 A1 | 6/2002 | Sumanaweera | |
| 2003/0013951 A1 | 1/2003 | Stefanescu et al. | |
| 2004/0208482 A1 | 10/2004 | Suga et al. | |
| 2004/0215721 A1* | 10/2004 | Szeto | H04L 12/58 709/204 |
| 2005/0010553 A1 | 1/2005 | Liu | |
| 2005/0010602 A1 | 1/2005 | Loui et al. | |
| 2005/0050150 A1* | 3/2005 | Dinkin | G06Q 10/107 709/207 |
| 2005/0274807 A1 | 12/2005 | Barrus et al. | |
| 2006/0031314 A1* | 2/2006 | Brahms | H04L 12/585 709/206 |
| 2006/0041560 A1* | 2/2006 | Forman | G06F 17/30864 |
| 2006/0041564 A1 | 2/2006 | Jain et al. | |
| 2006/0053364 A1 | 3/2006 | Hollander et al. | |
| 2006/0107297 A1 | 5/2006 | Toyama et al. | |
| 2006/0143558 A1 | 6/2006 | Albornoz et al. | |
| 2006/0167876 A1 | 7/2006 | Benitez et al. | |
| 2006/0294085 A1 | 12/2006 | Rose et al. | |
| 2007/0092142 A1 | 4/2007 | Kuriathungal et al. | |
| 2007/0112761 A1 | 5/2007 | Xu et al. | |
| 2007/0150802 A1 | 6/2007 | Wan et al. | |
| 2007/0219858 A1* | 9/2007 | Seymour et al. | 705/14 |
| 2007/0250901 A1 | 10/2007 | McIntire et al. | |
| 2007/0271226 A1 | 11/2007 | Zhang et al. | |
| 2007/0271249 A1 | 11/2007 | Cragun et al. | |
| 2007/0282907 A1 | 12/2007 | Chambers | |
| 2007/0288453 A1 | 12/2007 | Podilchuk | |
| 2008/0052372 A1* | 2/2008 | Weber et al. | 709/217 |
| 2008/0056538 A1* | 3/2008 | Frank | 382/113 |
| 2008/0092051 A1 | 4/2008 | Sidon et al. | |
| 2008/0136838 A1 | 6/2008 | Goede et al. | |
| 2008/0141128 A1 | 6/2008 | Takahashi et al. | |
| 2008/0154738 A1* | 6/2008 | Jain et al. | 705/26 |
| 2008/0195931 A1* | 8/2008 | Raghupathy et al. | 715/230 |
| 2008/0201368 A1 | 8/2008 | Lee et al. | |
| 2008/0201734 A1 | 8/2008 | Lyon et al. | |
| 2008/0215456 A1 | 9/2008 | West et al. | |
| 2008/0249891 A1 | 10/2008 | Gura | |
| 2008/0262960 A1 | 10/2008 | Malone et al. | |
| 2008/0288454 A1 | 11/2008 | Swadi | |
| 2008/0288509 A1* | 11/2008 | Mysen et al. | 707/100 |
| 2009/0024577 A1 | 1/2009 | Prestel et al. | |
| 2009/0027418 A1 | 1/2009 | Maru et al. | |
| 2009/0049156 A1* | 2/2009 | Aronsson et al. | 709/219 |
| 2009/0063455 A1 | 3/2009 | Li et al. | |
| 2009/0076800 A1 | 3/2009 | Li et al. | |
| 2009/0171918 A1 | 7/2009 | Manber et al. | |
| 2009/0175532 A1 | 7/2009 | Zuev et al. | |
| 2009/0232417 A1 | 9/2009 | McMahan | |
| 2009/0240668 A1 | 9/2009 | Li | |
| 2009/0248665 A1* | 10/2009 | Garg et al. | 707/5 |
| 2009/0282327 A1 | 11/2009 | Hamilton, II et al. | |
| 2011/0191211 A1 | 8/2011 | Lin | |

FOREIGN PATENT DOCUMENTS

| | | |
|---|---|---|
| JP | 2004246454 | 9/2004 |
| JP | 2006108913 | 4/2006 |
| JP | 2007087409 | 4/2007 |
| JP | 2008219091 | 9/2008 |

OTHER PUBLICATIONS

Bottoni et al., "Storing and Retrieving Multimedia Web Notes," In: "Field Programmable Logic and Application", Jan. 1, 2005, Berlin, Hiedelbert, vol. 3433, pp. 119-137.

Chinese Office Action mailed Apr. 8, 2011 for Chinese patent application No. 200810173071.6, a counterpart foreign application of U.S. Appl. No. 12/663,743, 36 pages.

Chinese Office Action mailed Aug. 23, 2010 for Chinese patent application No. 200810173071.6, a counterpart foreign application of U.S. Appl. No. 12/663,743, 20 pages.

Chinese Office Action mailed Sep. 6, 2011 for Chinese patent application No. 200810173071.6, a counterpart foreign application of U.S. Appl. No. 12/663,743, 38 pages.

Extended European Search Report mailed Nov. 27, 2012 for European patent application No. 09829705.4, 8 pages.

Translated Japanese Office Action mailed Dec. 10, 2013 for Japanese patent application No. 2011-538621, a counterpart foreign application of U.S. Appl. No. 12/663,743, 9 pages.

Non-Final Office Action for U.S. Appl. No. 12/663,743, mailed on Mar. 1, 2013, Xuanyin Lin, "Image Search Apparatus and Methods Thereof", 62 pages.

Non-Final Office Action for U.S. Appl. No. 12/663,743, mailed on Apr. 12, 2012, Xuanyin Lin, "Image Search Apparatus and Methods Thereof", 14 pages.

Final Office Action for U.S. Appl. No. 12/663,743, mailed on Jul. 18, 2013, Xuanyin Lin, "Image Search Apparatus and Methods Thereof", 74 pages.

Non-Final Office Action for U.S. Appl. No. 12/663,743, mailed on Sep. 10, 2012, Xuanyin Lin, "Image Search Apparatus and Methods Thereof", 33 pages.

Translated Japanese Office Action mailed Jun. 17, 2014 for Japanese patent application No. 2011-538621, a counterpart foreign application of U.S. Appl. No. 12/663,743, 4 pages.

* cited by examiner

IMAGE SEARCH APPARATUS AND METHODS THEREOF

RELATED APPLICATIONS

This application claims priority to and is a continuation of U.S. patent application Ser. No. 12/663,743, filed Dec. 9, 2009, entitled "IMAGE SEARCH APPARATUS AND METHODS THEREOF" which is a national stage application of international patent application PCT/US09/64210, filed Nov. 12, 2009, entitled "IMAGE SEARCH APPARATUS AND METHODS THEREOF" claiming priority from Chinese patent application No. 200810173071.6, filed Nov. 26, 2008, entitled "METHOD AND SERVER TO PROVIDE FOR IMAGE SEARCH", which applications are hereby incorporated in their entirety by reference.

TECHNICAL FIELD

The present disclosure is related to a field of computer network technology, and particularly to an apparatus that enables image search and methods thereof.

BACKGROUND

In addition to allowing users to conduct text-based searches, image-based searches are also presently available on the Web. Accordingly, a user may conduct an image search once the user is connected to a website.

Conventional Web search engines such as Google, Yahoo and MSN have already provided image searching services. This kind of searching implements an inquiry function by building up indices based primarily on filenames of images and is therefore similar to an ordinary textual keyword search or a keyword search based on a filename. Although this filename-based searching method may satisfy typical search demands, it nevertheless fails to provide further search related to information of the image.

SUMMARY

Various embodiments of the present disclosure aim to provide a method and an apparatus of image search in order to allow more searches related to information of an image.

In order to solve the aforementioned technical problem, the embodiments of the present disclosure provide a method and an apparatus of image search, exemplary implementations of which are described below.

In one aspect, a method of image search includes:
a server receiving a request from a client and providing a web page in response to the request, where the web page allows an image to be uploaded and annotation content to be submitted for the image;
the server receiving and storing the image and the annotation content for the image; and
the server providing the annotation content for the image as a search index to an image search engine.

Preferably, the method may further include:
adding a frame label for a portion of the image.

Preferably, receiving and storing the image and the annotation for the image by the server may include:
receiving and storing by the server the frame label that is added for a portion of the image.

Preferably, storing the annotation content for the image may include:
storing the annotation content in a database and associating the annotation content with the image; or
storing the annotation content in auxiliary information of the image and storing the image.

Preferably, when the image is in jpg or jpeg format, storing the annotation content in the auxiliary information of the image and storing the image may include:
storing the annotation content into a user comments tag in accordance with the Exchangeable image file format (Exif) specification and storing the image.

Preferably, upon receiving the image and the annotation content for the image but prior to storing by the server, the method may further include:
examining the annotation content submitted by a user.

Preferably, the method may further include:
organizing in advance a format of question and answer and a scoring rule for annotation content submission.

Preferably, under the circumstance of organizing in advance the format of question and answer and the scoring rule for annotation content submission:
storing the annotation content in the database and associating the annotation content with the image by the server may be achieved by:
storing in the database the best annotation content detected after scoring and associating the best annotation content with the image; and
storing the annotation content in the auxiliary information of the image and storing the image, which may be achieved by:
storing in the database the best annotation content detected after scoring as related information of the image and storing the image.

Preferably, when the annotation content includes a URL address of a seller of merchandise, storing the annotation content in the database and associating the annotation content with the image may further include:
storing in the database merchandise information on a web page that is linked by the URL in the annotation content and associating the image therewith; and
storing the annotation content in the auxiliary information of the image and storing the image may further include:
storing in the auxiliary information of the image merchandise information on a web page that is linked by the URL in the annotation content and storing the image.

Preferably, the annotation content may include a combination of one or more of the following elements:
texture, material, specification, place of production, unit price and use of merchandise in the image, a URL address of a seller of merchandise in the image, a contact method of the seller, or a comment about the merchandise.

In another aspect, a method of image search includes:
receiving a request and providing a web page in response to the request, where the web page includes an image and allows submission of annotation content for the image;
receiving and storing the annotation content for the image; and
providing the annotation content for the image as a search index to an image search engine.

Preferably, the method may further include:
adding a frame label for a portion of the image in the web page.

Preferably, receiving and storing the annotation content for the may include:
receiving and storing the frame label that is added for a portion of the image.

Preferably, storing the annotation content for the image may include:
storing the annotation content in a database and associating the annotation content with the image; or storing the annotation content in auxiliary information of the image and storing the image.

Preferably, when the image is in jpg or jpeg format, storing the annotation content in the auxiliary information of the image and storing the image may include:

storing the annotation content in a user comments tag in accordance with the Exif specification and storing the image.

Preferably, upon receiving the annotation content for the image but prior to storing, the method may further include:

examining the annotation content submitted by a user.

Preferably, the method may further include;

organizing in advance a format of question and answer and a scoring rule for annotation content submission.

Preferably, under the circumstance of organizing in advance the format of question and answer and the scoring rule for annotation content submission, storing the annotation content in the database and establishing the association between the annotation content and the image may be achieved by:

storing in the database the best annotation content detected after scoring and associating the best annotation content with the image; where storing the annotation content in the auxiliary information of the image and storing the image is achieved through the following:

storing the best annotation content detected after scoring in the auxiliary information of the image.

Preferably, when the annotation content includes a URL address of a seller of merchandise, storing the annotation content in the database and associating the annotation content with the image may further include:

storing in the database merchandise information on a web page linked by the URL in the annotation content and associating the image therewith; where storing the annotation content in the auxiliary information of the image and storing the image may further include:

storing in the auxiliary information of the image the merchandise information on a web page that is linked by the URL in the annotation content and storing the image.

Preferably, the annotation content may include a combination of one or more of the following elements:

texture, material, specification, place of production, unit price and use of merchandise in the image, a URL address of a seller of merchandise in the image, a contact method of the seller, or a comment about the merchandise.

In one aspect, an apparatus that enables image search may include:

a web page response unit that receives a request from a client and provides a web page to the client in response to the request, where the returned web page allows an image to be uploaded and annotation content to be submitted for the image;

a storage unit that receives and stores the image and the annotation content for the image; and a search engine interface that provides the annotation content for the image as a search index to an image search engine.

Preferably, a frame label may be added for a portion of the image in the returned web page.

Preferably, the storage unit may receive and store the frame label that is added for part of the image.

Preferably, the storage unit may include a database and an association unit, where the database stores the annotation content, and the association unit associates the annotation content stored in the database with the image corresponding thereto.

Preferably, the apparatus may further include an annotation parser to write the annotation content in auxiliary information of the image.

Correspondingly, the storage unit may store the image that has the auxiliary information having the annotation content.

Preferably, upon receiving a request for retrieving the annotation content from the search engine, the annotation parser may parse the annotation content from the auxiliary information of the image and return the annotation content to the user client, or return the annotation content to the user client through a search.

Preferably, the apparatus may further include a best annotation content selection unit to select the best annotation content after scoring when the annotation content satisfies a scoring rule.

Correspondingly, the database may store the best annotation content, and the association unit may associate the best annotation content stored in the database with the image.

Preferably, the apparatus may further include a URL link parsing unit to parse merchandise information on a web page that is linked by a URL in the annotation content.

And correspondingly, the database may store the merchandise information on the web page that is linked by the URL in the annotation content.

Preferably, the apparatus may further include a URL link parsing unit to parse merchandise information on a web page that is linked by a URL in the annotation content.

Correspondingly, the annotation parser may write into the auxiliary information of the image the merchandise information on the web page linked that is by the URL in the annotation content.

In another aspect, an image search apparatus may include:

a web page response unit that receives a request from a client and provides a web page to the client in response to the request, where the returned web page includes an image and allows annotation content to be submitted for the image;

a storage unit that receives and stores the annotation content for the image; and a search engine interface that provides the annotation content for the image as a search index to an image search engine.

Preferably, a frame label may be added for a portion of the image in the returned web page.

Preferably, the storage unit may receive and store the frame label that is added for part of the image.

Preferably, the storage unit may include a database and an association unit, where the database stores the annotation content, and the association unit associates the annotation content stored in the database with the image corresponding thereto.

Preferably, the apparatus may further include an annotation parser to write the annotation content into auxiliary information of the image.

Correspondingly, the storage unit may store the image that has the auxiliary information having the annotation content.

Preferably, upon receiving a request for retrieving the annotation content from the search engine, the annotation parser may parse the annotation content from the auxiliary information of the image and return the annotation content to the user client, or return the annotation content to the user client through a search engine.

Preferably, the apparatus may further include a best annotation content selection unit to select the best annotation content after scoring when the annotation content satisfies a scoring rule.

Correspondingly, the database may store the best annotation content, and the association unit may associate the best annotation content stored in the database with the image.

Preferably, the apparatus may further include a URL link parsing unit to parse merchandise information on a web page that is linked by a URL in the annotation content.

Correspondingly, the database may store the merchandise information on the web page that is linked by the URL in the annotation content.

Preferably, the apparatus may further include a URL link parsing unit to parse merchandise information on a web page that is linked by a URL in the annotation content.

Correspondingly, the annotation parser may write into the auxiliary information of the image the merchandise information on the web page that is linked by the URL in the annotation content.

As illustrated by the technical schemes provided in the various embodiments of the present disclosure, more searches related to information of an image are provided regardless of which scheme is used. In one embodiment, a server receives a request and returns a web page that allows uploading an image and adding annotation content for the image, receives and stores the image and the annotation content for the image, and provides the annotation content for the image as a search index to an image search engine. In another embodiment, the server receives a request and returns a web page that includes an image and allows adding annotation content for the image, receives and stores annotation content for the image, and provides the annotation content for the image as a search index to an image search engine. Additionally, more business transactions are likely to be consummated due to additional information being provided about merchandises in the image.

DESCRIPTION OF DRAWINGS

In order to understand the technical schemes of the exemplary embodiments of the present disclosure more clearly, accompanying figures required for explaining the exemplary embodiments are briefly described. It should be understood that the following figures only constitute some exemplary embodiments of the present disclosure.

DETAILED DESCRIPTION

Methods and apparatus of image search are described using the exemplary embodiments provided below.

In order to allow one ordinarily skilled in the art to understand the technical schemes of the present disclosure in a better way, the technical schemes in the exemplary embodiments of the present disclosure are described in a clear and complete manner below through the accompanying figures associated with the respective exemplary embodiments. It should be understood that the exemplary embodiments described herein only constitute parts of, not all, the embodiments of the present disclosure.

Generally, the Web includes user clients (e.g., user terminal devices), networks and servers (such as a Web server). A user client may be a Web user terminal such as a desktop, a laptop, a smart device having a Web browsing function (e.g., Personal Digital Assistant, PDA), a Mobile Internet Device (MID), or an Ultra-mobile Personal Computer (UMPC), etc. This user client may request another process (e.g., a process provided by a server) to provide a certain service in a Web environment (typically the Internet environment, for example).

A server is generally a remote computing apparatus which is accessed through a communication medium such as the Web (typically the Internet, for example). Moreover, the server can generally provide services to multiple user clients over the Web. The process of providing a service includes: receiving a request from a user client, collecting data related to the user client, and returning information, etc. Essentially, the server plays a role of an information provider in a computer network. A server is typically on the service providing side and its service content may be configured by a service provider. An example of this service provider is a website of a Web service company.

Figure 1:
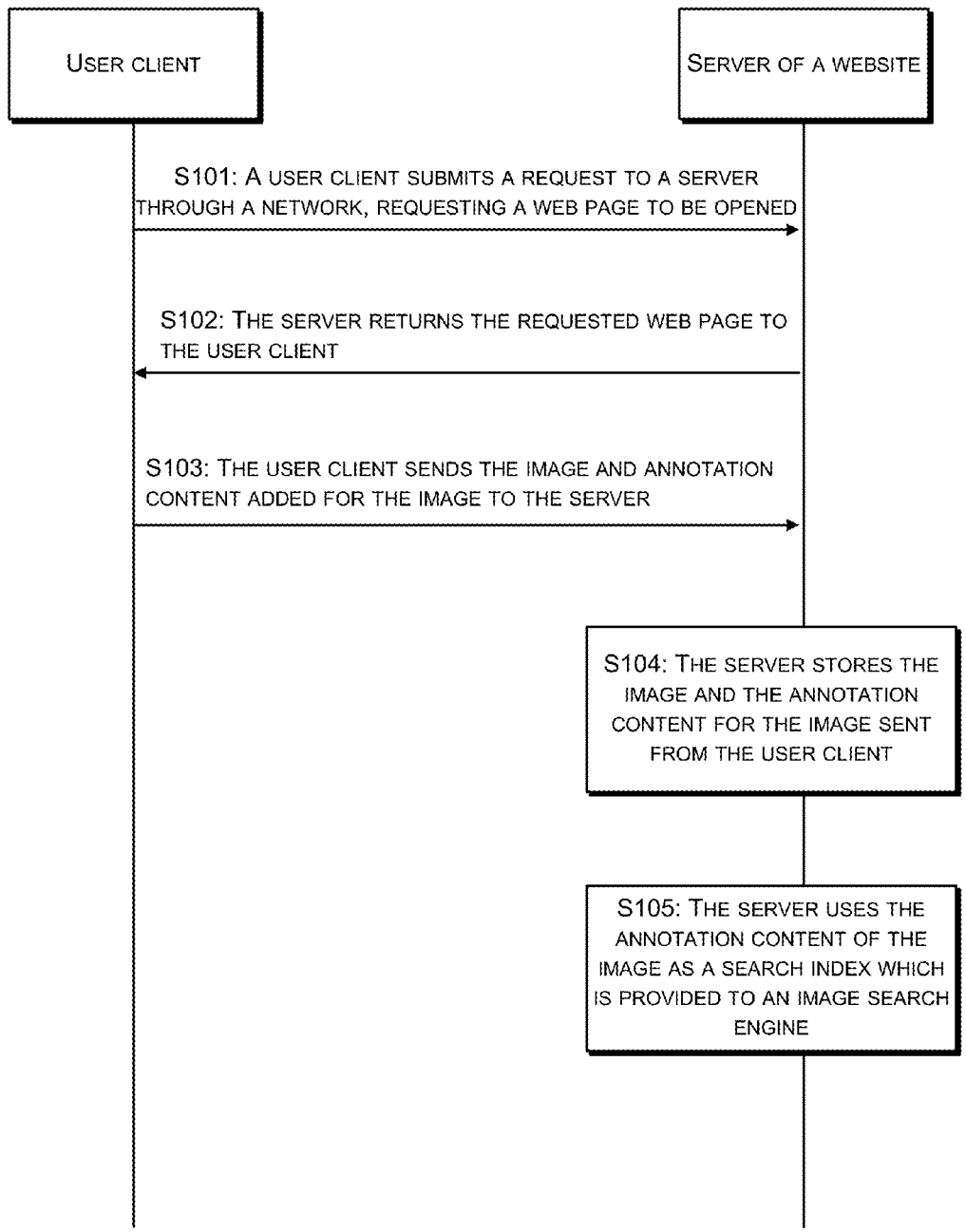
FIG. 1 shows a flow chart of a first exemplary method in accordance with the present disclosure.

A method of image search in accordance with a first exemplary embodiment of the present disclosure is described as follows. FIG. 1 shows a flow chart of this exemplary embodiment. As shown in FIG. 1, the exemplary embodiment includes the following actions:

S101: A user client submits a request to a server through a network, requesting a web page to be opened.

Usually, a user client opens a web page by entering a Uniform Resource Locator (URL) into an address field of a browser or by being directed to a web page through a URL link. Basically, the user client submits a request to a server, such as a server of a certain website for example, to open a web page of the website.

S102: The server returns the requested web page to the user client.

In one embodiment, the server may allow the user client to upload an image onto the returned web page and add an annotation for the uploaded image.

Furthermore, in another embodiment, a function of adding a frame label for part of the image may further be provided in the web page returned by the server. An "annotating" technology exists in JavaScript implementation and is implemented through JavaScript objects and methods.

Specifically, certain technology using Asynchronous JavaScript and XML (AJAX) may be utilized to achieve this function. AJAX is a web page development technology for creating interactive web page applications. AJAX applications use Web browsers that support the above technology as operating platforms. Currently, these browsers include:

Internet Explorer, Mozilla Firefox, Opera, Konqueror and Safari of Mac OS. Yahoo has disclosed a series of AJAX design patterns when releasing AJAX toolkits which are called the Yahoo! User Interface (YUI). These toolkits of Yahoo are AJAX toolkits released after Yahoo acquired a number of Web2.0 websites, and have more complete code annotations as well as rich and detailed documentation. As the number of YUI components continuously increases, YUI includes such components as AJAX, within which are toolkits obtained after packaging low-level JavaScript (which include connection, event, Dom, animation and dnd). Furthermore, a group of high-level JavaScript ActiveX controls, which currently comprise AutoComplete, Calendar, Container, Menu, Slider and TreeView, are included. The relatively pioneer website http://www.fotonotes.net, the famous Flickr website, and even the Chinaren website all provide similar frame labeling function for an image.

Accordingly, the user client may add a frame label to an image on a Java-supported browser using one or more of these technologies. Specifically, these technologies may be used to provide to a user client a frame labeling function for part of the image.

S103: The user client sends the image and annotation content added for the image to the server.

Besides uploading an image, the user client may add annotation content for the image through a text box provided in the web page.

Figure 2:
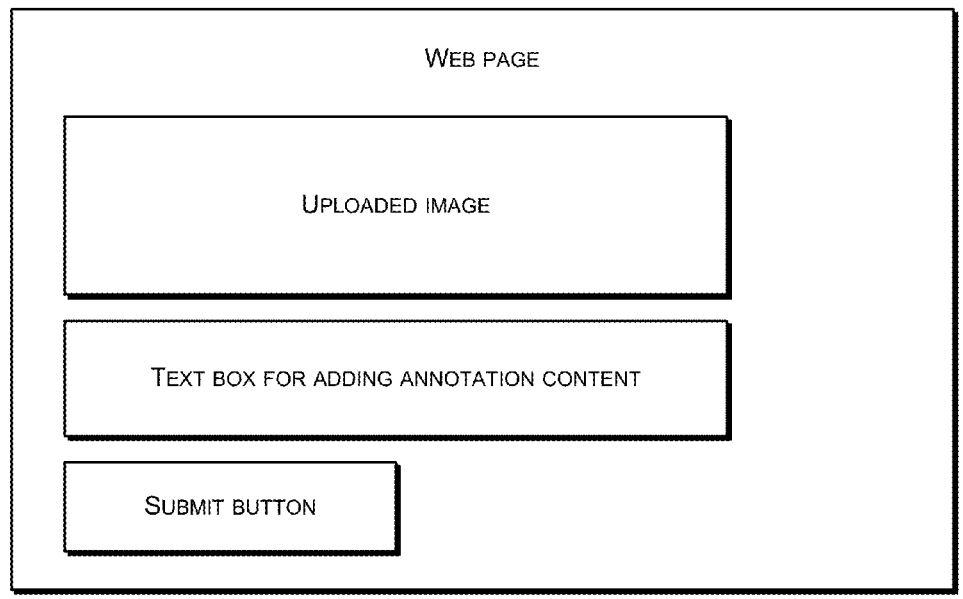
FIG. 2 shows a schematic diagram of a web page including a text box and a submit button in accordance with the present disclosure.

As shown in FIG. 2, in one embodiment, a text input box and a submit button may be provided near the image in the web page to allow a user client to enter textual input in the text input box as annotation content for the image to annotate the image. Upon entering textual input as the annotation content of the image in the text box, the user client clicks the submit button to submit to the server the textual input, as the annotation content of the image, along with the image. Simply put, the added annotation content of the image is also sent to the server.

It should be noted that the annotation content may be a description written by the user client and may be related to a merchandise shown in an image in particular to describe, for example, texture, material, place of production, unit price, function and use of the merchandise, a URL address of an online store of the merchandise's seller, contact method of the seller, and/or comments for the merchandise.

At S103, besides adding the annotation content for the image, the user client may further add a frame label to the image using the provided frame labeling function, and send the frame label to the server. In one embodiment, the frame label can be sent along with the image and the annotation content to the server.

Figure 3:
FIG. 3 shows a schematic diagram of a frame label in accordance with the present disclosure.

FIG. 3 shows an intuitive example of a frame label. Upon the user client clicking on a button labeled with "Add" or "Add Frame Label", for example, at the bottom of the image in the web page, a default frame appears on the image. In one embodiment, the user client may move the frame to a desired position on the image and adjust the size or aspect ratio of the frame, etc. Furthermore, in another embodiment, an annotation may be provided beside the frame and a textual input may be added within an annotation box.

Therefore, if the user client wants to label the frame and add annotation content for the image in the web page, the annotation content may be added to the annotation box of the frame label.

In one embodiment, the frame labeling operation can be implemented by JavaScript in the user client while privilege management of the frame label may be realized by the server.

With respect to online transaction platforms (e.g., such as business-to-business, or B2B, business-to-consumer, or B2C, and consumer-to-consumer, or C2C, websites), the content of the frame is typically a product (in the image) that is framed by the user client. Within the annotation content of the frame label there may be a description of the product and/or a URL address of the seller's online store, for example, as described above.

It should be noted that, from the receiving perspective of the server, in various embodiments, S103 may include an activity of submitting an image and adding annotation content as well as a frame label for the image by a certain user, an activity of submitting different annotation contents for the same image by different users, or an activity of submitting different annotation contents for the same image by the same user in multiple times. In one embodiment, submitting different annotation contents for the same image by the same user in multiple times may include separately submitting multiple annotation contents and frame labels for the same image in multiple times.

In conventional web page technology, after a user client adds annotation content for an image in a web page or adds a frame label for the image (in addition to annotation content) in the browsed web page, an activity of submitting them to a server entails sending the image, the annotation content and the frame label (if included) to the server. It is noted that the image is included in the submission regardless of whether the image previously existed in the web page or has been uploaded from the client in the current browsing event. On the other hand, in case that the image pre-existed in the web page, an embodiment of the present disclosure provides an additional option of submitting only the annotation content for the image and the frame label (if included) to the server without resending the image. This avoids transmitting the same content (i.e., the image in the web page in this case) back and forth between the server and the user client, thereby saving bandwidth and resulting in fast interaction for improvement of user browsing experience.

S104: The server stores the image and the annotation content for the image received from the user client.

Some implementation methods for storing annotation content for an image by the server according to various embodiments are described below.

1. In one embodiment, the server stores the annotation content in a database and associates the annotation content with the image.

This method is simple and implementable, with relatively good scalability and maintainability. Currently, image websites such as Flickr and Yupoo adopt this scheme.

One skilled in the art can appreciate that the database described herein may be a separate device connected with the server or a component in the server such as a software-implemented database in the server. This type of method does not limit the size of the content that can be annotated by the user client, thus allowing storage of a large amount of information.

2. In another embodiment, the server stores the annotation content in auxiliary information of the image and then stores the image.

For example, when the image is in jpg or jpeg format, its file characteristics (i.e., pursuant to the Exif specification) include a reserved tag for user comments. In the jpg or jpeg format standard, this tag is reserved and not defined, and thus has no restriction and is available to be defined by a developer. The following table is a table showing a portion of the Exif specification regarding the jpg image format.

TABLE 1

Exif Image File Directory Characteristics

| | Tag Name | Field Name | Tag ID Dec | Hex | Type | Count |
|---|---|---|---|---|---|---|
| A | Tags Relating to Version | | | | | |
| | Exif Version | Exif Version | 36864 | 9000 | UNDEFINED | 4 |
| | Supported Flashpix version | FlashpixVersion | 40960 | A000 | UNDEFINED | 4 |
| B | Tag Relating to Image Data characteristics | | | | | |
| | Color space information | ColorSpace | 40961 | A001 | SHORT | 1 |
| C | Tags Relating to Image Configuration | | | | | |
| | Meaning of each components | ComponentsConfiguration | 37121 | 9101 | UNDEFINED | 4 |
| | Image compression mode | CompressedBitsPerPixel | 37122 | 9102 | RATIONAL | 1 |
| | Valid image width | PixelXDimension | 40962 | A002 | SHORT OR LONG | 1 |
| | Valid image height | PixelXDimension | 40963 | A003 | SHORT OR LONG | 1 |
| D | Tags Relating to User Information | | | | | |
| | Manufacturer notes | MakerNotes | 37500 | 927C | UNDEFINED | Any |
| | User Comments | UserComment | 37510 | 9286 | UNDEFINED | Any |
| E | Tags Relating to Related File Information | | | | | |
| | Related Audio File | RelatedSoundFile | 40964 | A004 | ASCII | 13 |

As shown in the row of boldface letters in Table 1, the Exif characteristic of the jpg format has a reserved tag for user comments. This tag is of undefined type and has no restriction on length, thus allowing an addition of content by a user or a developer.

This tag allows the annotation content to be stored in the auxiliary information of the image.

Similarly, images in other formats such as images in bmp or png format can have annotation contents to be stored in respective auxiliary information of the images. In the interest of brevity, the details are not described herein.

In one embodiment, when the submitted content further includes a frame label for the image as described above, the server not only stores the image and the annotation content for the image that are received from the user client but also stores the frame label for the image. In particular, the server may further store the annotation content within the frame label through one of the above two methods.

In one embodiment, the above two methods may store a URL link and have the information stored in a tabular form. Generally, for shopping websites such as online transaction platforms (e.g., websites of the B2B type, B2C type or C2C type), an address where the product can be purchased (e.g., URL address of the seller) may be stored. Moreover, the information can be categorically stored in a tabular form. Furthermore, these two methods both support development by a user or a developer, thus providing more varieties of information storage.

In one embodiment, the server needs to create an annotation parser in the latter method. When an annotation is stored, the annotation parser writes the annotation content into the auxiliary information of the image. Accordingly, in one embodiment, when the image requested to be displayed is returned to a client (e.g., after performing the activity of S105 described below) and the search engine sends out a request for retrieving corresponding annotation content, the annotation parser parses out the annotation content from the auxiliary information of the image and returns the annotation content to the user client or returns the annotation content to the user client through the search engine.

S105: The server uses the annotation content of the image as a search index which is provided to an image search engine.

In one embodiment, the image search engine is implemented using a separate device of the website. Alternatively, the image search engine may be integrated in the server. Deployment of this kind depends on scale, implemented functions and needs of associated website. In other embodiments, other plausible means may also be used.

Most existing image searching techniques conduct an image search using an image name. As the filename of the respective image, the image name is similarly limited by word count and format, and so forth. For example, total word count, inclusive of extension and separator(s), generally cannot exceed two hundred and fifty-five bytes in Windows operating system. Besides, a filename cannot provide a URL link and cannot have formatted content. As a result, a large amount of information cannot be stored in a filename.

At S105, annotation contents for images are used as search indices. In one embodiment, the database performs a specific ordering of the indices, e.g., establishing reverse indices, to allow more search inquiries that are faster and more comprehensive. As such, a search result can have more abundant contents related thereto. Upon receiving a query and obtaining a result based on a keyword associated with the query as well as having the search engine searching through the indices, all annotation contents and associated images contained in the result are returned to the inquiring party. In some embodiments, in order to provide more images and information in the returned result, the images are provided in thumbnail size and a certain selected number of words of annotation contents are returned.

For the image returned after search, the user can see the information therein, particularly the URL address of the seller in the annotation content or the seller address where the product labeled by the frame label is sold. The user can click on the address to be directed to a web page of the seller of the product, thereby leading to a transaction conducted between the user and the seller. In one embodiment, the URL address needs not appear in a form of a complete linked address but rather may be an icon or a text containing the linked address (such as, for example, texts or icons of sellers that usually appear in TaoBao.com). Furthermore, icons for instant messaging with the seller (such as, for example, portraits of sellers that are usually appear in TaoBao.com) may further be included. Upon clicking on a portrait by the user, an instant messaging application is initiated to allow real-time communication with the seller. Alternatively, the instant messaging application may be opened in the web page to allow instant messaging with the seller.

In one embodiment, between S103 and S104, additional activities that may be included are described below.

S103': The server examines the annotation content submitted by the user.

An examination includes one or a combination of two of the following meanings: examination of the legitimacy of annotation content and examination for the best annotation content.

Examining legitimacy of annotation content includes the following according to one embodiment. During the activities of adding annotation content or submitting multiple annotation contents for the same image by a user as described above, annotation content containing word(s) that is/are included in a predetermined illegitimate word lexicon is/are filtered out. This ensures annotation content to conform to the laws of the country and social conscience, etc.

With respect to examining for the best annotation content, the best annotation content may be selected by a human operator in one embodiment. For instance, the merchandise in an image may be described by multiple annotation contents. Different annotation contents may have different details and different accuracies. A staff may manually select the best annotation content while deleting the other annotation contents.

In one embodiment, the server may support activities of submitting multiple annotation contents for a given image. In another embodiment, the server may provide a format of question and answer and a scoring rule for annotation content submission in order to facilitate more and better annotation contents provided by user clients.

In one embodiment, the website may divide annotation contents submitted by users into two types: a question type and an answer type. When submitting annotation content, a user may select the type to which the annotation content belongs, i.e., a question type or an answer type. Take the question type as an example first. Upon seeing a product in an image, a user performs frame labeling of the product in the image and adds an annotation asking what brand and price of the product are. Moreover, the web page provided by the server may further have an option of product categories such that the user may select a category associated with the product when asking questions about the product. Other users may answer the questions in the image and select these answers as belonging to annotation content of an answer type when seeing the image and the annotation content. In one embodiment, during the process of answering the questions, the server may set up the option of product categories in the provided web page. The person who answers the questions can select a category associated with the product when answering the questions related to the product. Upon seeing the answers, the user who raises the questions can evaluate the answers (if there are multiple answers, for example) such that the user who provides a better answer will receives a higher score. More importantly, more and richer annotation contents for an image are encouraged through constructive mechanism such that better annotation content is made prominent. Moreover, this constructive mechanism facilitates acquisition of more objective and rational annotation content.

In one embodiment, when the server organizes a format of question and answer and a scoring rule for annotation content submission with users providing more annotation contents, the submitted annotation contents may be examined pursuant to the description of the activity of S103'.

A practical scenario is used to explain the details of the above description and provided herewith. On an online transaction platform, a buyer may not know a certain product in a certain image, e.g., a shirt worn by Jay Chou on the cover of CD <<I am very busy>>, and wants to obtain information of the product. The user may promulgate the image on the web page (i.e., the cover of the CD <<I am very busy>> by Jay Chou) and adds annotation content (e.g., the annotation content is of a question type, inquiring product information of the shirt in the image). The user may further frame and label the shirt in the image to intuitively point out his/her desire to know the information of the product. Moreover, while questioning, the user may select a category associated with the product in the web page, such as clothes/shirt, for example. Upon seeing the image, other users or the seller may continue to add annotation contents for the shirt in the image. For example, if the annotation content is of an answer type, the annotation content may include answers to the questions (e.g., information such as brand, texture, material and style of the shirt) and may further include an address of the seller of the product such as a URL address. The other users or the seller may also select a category associated with the product when adding the annotation contents or when answering the questions. Furthermore, any interested user may acquire this image through searching to obtain the questions and the answers associated with the image and enter into a transaction web page of the product through the seller's URL link in the annotation content to complete a trans action.

Tasks that can be processed by a server, in the context that the server can organize a format of question and answer and a scoring rule for annotation content submission, are described below.

When submitting annotation content, a questioner may select a category to which the annotation content belongs, i.e., a question type. Specifically, the questioner performs frame labeling to a product in an image on a web page and adds an annotation, asking about brand and sale price of the product. In one embodiment, the web page provided by the server may have an option of product categories. Hence, the questioner may select a category associated with the product when asking a question about the product. Upon seeing the image and the annotation content, other respondents (possibly including the seller of the product) answer the questions in the image and select corresponding answers as belonging to annotation content of an answer type. In one embodiment, the web page provided by the server may have an option of product categories when a respondent answers the questions. In this way, the respondent may select a category associated with the product. A submitted question may be answered by a number of respondents. As such, a number of answers may be received for the same question. After seeing the annotation contents answered by the respondents, the questioner provides scores to the answers. In the event that there are multiple answers, each answer has a corresponding score as produced according to the scoring rule provided by the server, with one of the answers having the highest score. The scores for these answers can be detected by the server. Therefore, the server may reckon the answer having the highest score to be the best answer which is then treated to be the answer for the submitted question and displayed in the annotation for the product in the image.

In one embodiment, the first method at S104 may be implemented in the following manner: the server stores in the database the best annotation content, which is the annotation content with the highest score, detected after scoring and associates the best annotation content with the image.

In another embodiment, the second method at S104 may be implemented as follows: the server stores in the auxiliary information of the image the best annotation content, which is the annotation content with the highest score, detected after scoring and stores the image.

Moreover, the annotation content (including the above best annotation content) detected by the server most likely includes a URL address such as an address of the seller of the product. The server may find a web page that is linked by the URL address in the annotation content. For example, the web page that is linked by the URL address is a web page describing the product. Regarding web pages having product descriptions, respective product descriptions on the web pages can be obtained by the server. For example, a product description in a seller store on TaoBao.com may be obtained by a server of TaoBao.com. In one embodiment, the first method at S104 may further include: (1) the server further stores in the database the product information in the web page that is linked by the URL in the annotation content and associates the product information with the image; or (2) the server further stores in the auxiliary information of the image the product information that is linked by the URL in the annotation content and stores the image.

In one embodiment, the product description in the web page has a specific format in most situations. For example, a web page of product description on TaoBao.com has "treasure details" in which a specific category item is described. For instance, the following various category items are described in treasure details of a clothes-related web page on TaoBao.com. An example description of various category items for a certain "shirt" is shown in the following table:

| | |
|---|---|
| Design: Long sleeve | Style: Korean |
| Brand: other | Price Range: 31-70 dollars |
| Collar: Stand Collar | Pattern: Pure Color |
| Season(s): Spring, Summer and Fall | Texture: Other |
| Color: White | Size: One-size-fits-all |
| Clothes Length: medium-long | |
| (clothes length: 50-70 cm) | |

Another example description of various category items of a certain "cell phone" is shown in the following table:

| | |
|---|---|
| Brand: iPhone | Apple Model Number: iPhone 8G (3G Version) |
| Cell Phone's Price Range: 3001-5000 dollars | Cell Phone's Release Time: 2008 |
| Network Type: 3G | External Appearance: Bar |
| Screen Color: 1.6 million | Treasure Quality: Brand New |
| Ring: MP3 ring | Camera Resolution: 0.2 M |
| Is A Smartphone: Smartphone | Operating System: iPhone |

It should be noted that the above specific category items may be options selected by the seller based on options provided by the server when the seller fills in the product information. Therefore, the server can easily obtain the specific formatted descriptions related to product information on the web page through the address linked by the URL of the web page, and process these specific formatted descriptions according to the above method in (1) or (2). These information descriptions are very useful to other users in understanding the product in the image when the image is browsed and obtained after search.

It should be noted that realizations of the above transactions have important significances to online transactions of the B2B, B2C and C2C types. First, existing online transaction platforms merely provide text search for a product. In a situation when a user does not know information related to a product, it is difficult to use accurate wording to describe the product. As such, it is difficult for the user to find the desired product through a text search. In certain sense, this kind of mode fails to satisfy the needs of a user in understanding and purchasing a product. On the contrary, the exemplary methods of the present disclosure allow an online transaction platform to immediately provide product information through recognition of a product displayed in an image by a user, and direct the user to an address where the product is for sale to conduct further transactional activities. As a result, factors that hinder a transaction due to a lack of information are greatly reduced, thus enhancing intuitive user experience. Second, only a seller can display an image of its product as well as collect and provide product information previously. For a user who submits a purchase request, the product is hard to be recognized intuitively in the form of text, thus hindering a transaction from concluding. The exemplary methods of the present disclosure, however, allow a seller or other users to provide product information related to a product in an image, thus facilitating a transaction to be concluded between the seller and a buyer.

Figure 4:
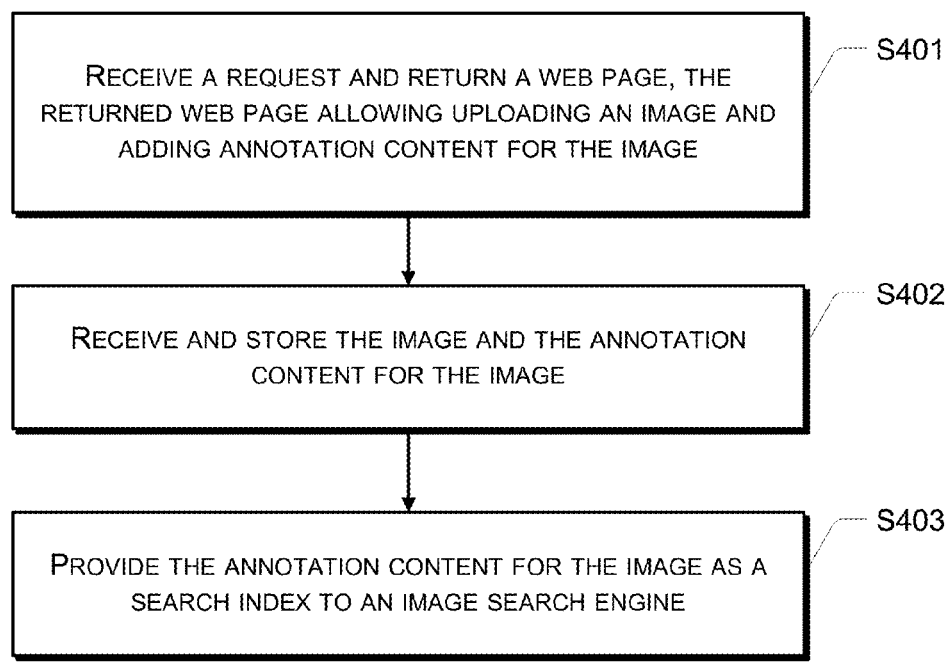
FIG. 4 shows a flow chart of a perspective of a server in accordance with the first exemplary method of the present disclosure.

The first exemplary embodiment is described from the perspective of the server below. FIG. 4 shows a flow chart in accordance with one embodiment.

S401: The server receives a request and returns a web page. In one embodiment, a user client is permitted to upload an image and/or add annotation content for the image in the returned web page.

In the returned web page, at S401, adding a frame label for part of the image is further permitted in another embodiment. As such, a user client may add a frame label for an image on a browser using this technology. Specifically, through this technology, the user client is provided with a function of frame labeling for a certain part of the image.

S402: The server receives and stores the image and the annotation content for the image.

A text for annotation content may be a description written by the user client related to a merchandise in the image in particular, such as, for example, texture, material, place of production, unit price, function and use of the merchandise, a URL address of an online store of a seller of the merchandise, contact method of the seller and comments for the merchandise, or any combination thereof.

The content of the frame is typically a product (in the image) that is framed by the user client. Within the annotation content of the frame label may be a description of the product and/or a URL address of the online store of the seller, for example, as described above.

In one embodiment, if the user client performs frame labeling for the image in the web page and adds annotation content, the annotation content may be added within an annotation box of the frame label.

It should be noted that, in various embodiments, the server may receive a submitted image and annotation content as well as a frame label for the image added by a certain user, different annotation contents for the same image submitted by different users, or from the same user in multiple times, for example. In one embodiment, receiving annotation contents multiple times from the same user may further include separately receiving multiple annotation contents and frame labels for the same image multiple times.

Two implementation methods for storing annotation content for an image by the server are described below.

1. In one embodiment, the server stores the annotation content in a database and establishes an association between the annotation content and the image.

2. In another embodiment, the server stores the annotation content in auxiliary information of the image and then stores the image.

For example, when the image is in jpg or jpeg format, the server may store the annotation content as user comments in accordance with the Exif specification.

S403: The server reckons the annotation content for the image as a search index and provides the annotation content to an image search engine.

In one embodiment, between S402 and S403, additional activities that may be included are described below.

S402': The server examines the annotation content submitted by the user.

In one embodiment, the server may organize a format of question and answer and a scoring rule for annotation content submission to facilitate more and better annotation contents provided by user clients.

In one embodiment, when the server organizes a format of question and answer and a scoring rule for annotation content submission, the following procedures may be used to implement storing the annotation content into a database and associating the annotation content with the image by the server:

storing in the database the best annotation content detected upon scoring and associating the best annotation content with the image by the server.

In one embodiment, the following procedures may be used to implement storing the annotation content in auxiliary information of the image and storing the image by the server:

storing in the auxiliary information of the image the best annotation content detected after scoring and storing the image by the server.

In one embodiment, when the annotation content includes a URL address of the seller of the merchandise, storing the annotation content in the database and associating the annotation content with the image by the server may include:

storing in the database the product information in the web page that is linked by the URL in the annotation content and associating the product information with the image by the server.

In one embodiment, storing the annotation content in the auxiliary information of the image and storing the image by the server may include:

storing in the auxiliary information of the image the product information that is linked by the URL in the annotation content and storing the image by the server.

A second exemplary method of image search in accordance with the present disclosure is described below. Descriptions about parts of the second exemplary embodiment that are equivalent or similar to those of the first exemplary embodiment can be found in respective descriptions in the first exemplary embodiment. The second embodiment focuses on the differences from the first exemplary embodiment.

Figure 5:
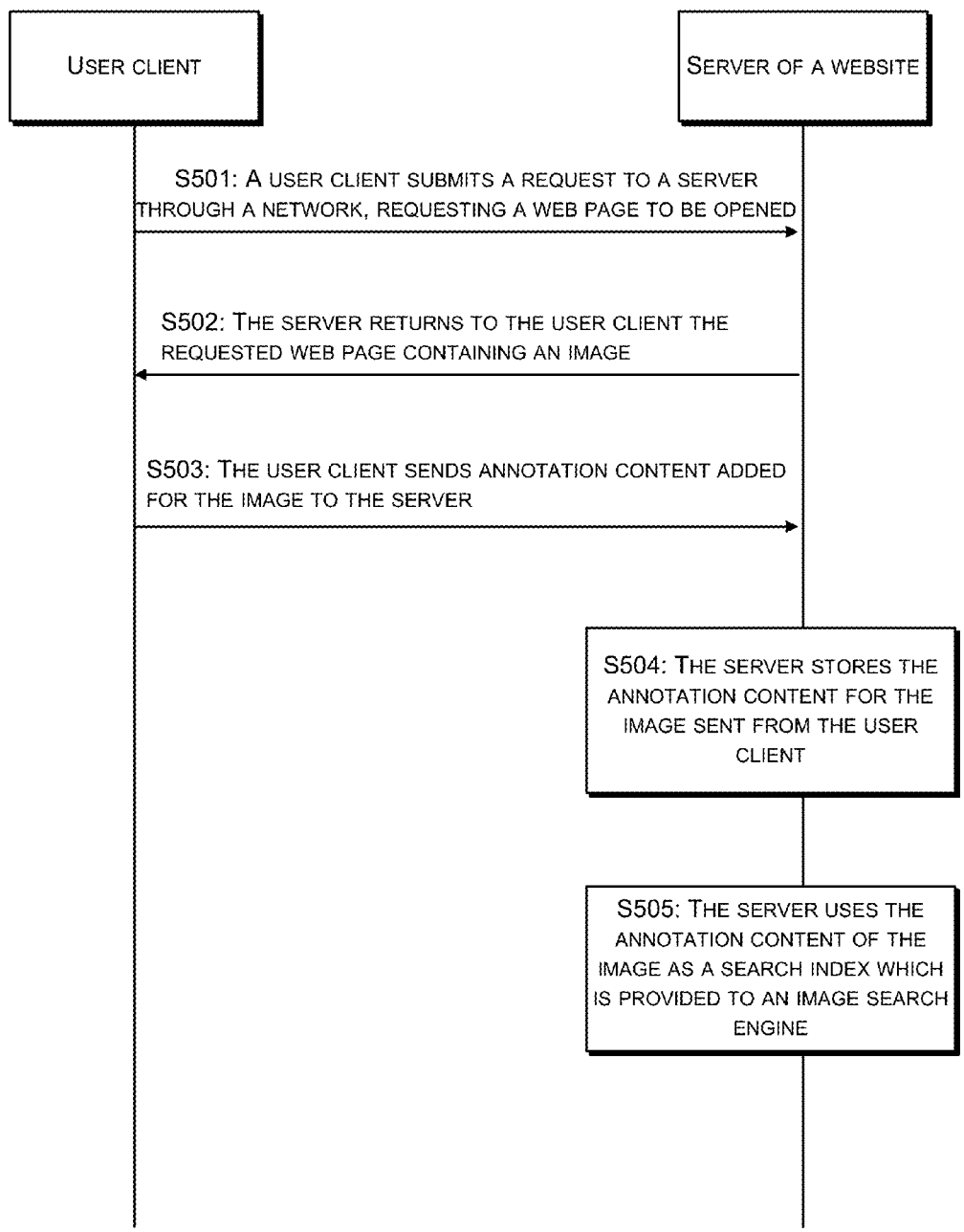
FIG. 5 shows a flow chart of a second exemplary method in accordance with the present disclosure.

FIG. 5 shows a flow chart of this exemplary embodiment. As shown in FIG. 5, the exemplary embodiment includes:

S501: A user client submits a request to a server through a network, requesting a web page to be opened.

S502: The server returns to the user client the requested web page that contains an image.

In one embodiment, the web page returned by the server contains an image and allows the user client to add annotation content for the image.

In another embodiment, a function of adding a frame label for the image is further provided in the web page returned by the server.

In yet another embodiment, the user client may add annotation content for the image through a text box provided in the web page.

At S503, besides adding annotation content for the image, the user client may further add a frame label.

At S503, besides adding annotation content for the image, the user client may further add a frame label to the image using a frame labeling function provided in the web page, and sends the frame label to the server. The frame label can be sent along with the annotation content to the server, for example.

If the user client performs frame labeling and adds annotation content for the image in the web page, then in one embodiment the annotation content may be added within an annotation box of the frame label.

With conventional web page technology, after a user client adds annotation content for an image in a web page or adds a frame label for the image (in addition to annotation content) in the browsed web page, an activity of submitting them to a server includes sending the image, the annotation content and the frame label (if included) to the server. It is noted that the image is included in the submission regardless of whether the image previously existed in the web page or has been uploaded from the user client in the current browsing event. On the other hand, current web page technologies utilized in the disclosed embodiments allow submitting only the annotation content for the image and the frame label (if included) to the server without resending the image when the image previously existed in the web page. This avoids transmitting the same content (i.e., the image in the web page in this case) back and forth between the server and the user client, thereby saving bandwidth and resulting in fast interaction for improvement of user browsing experience. The AJAX technology described above is one of these technologies.

S504: The server stores the annotation content for the image received from the user client.

Similar to the first exemplary embodiment, the following approaches may be used for storing the annotation content for the image by the server.

1. In one embodiment, the server stores the annotation content in a database and associates the annotation content with the image.

2. In another embodiment, the server stores the annotation content in auxiliary information of the image and then stores the image.

In case that the submitted content further includes a frame label for the image as described above, the server not only stores the annotation content for the image that is sent from the user client but also stores the frame label for the image. In particular, the server may further store the annotation content within the frame label through the above two methods.

The above two methods may store a URL link and have the information stored in a tabular form.

Specifically, the server needs to create an annotation parser in the latter method. In one embodiment, when an annotation is stored, the annotation parser writes the annotation content into the auxiliary information of the image. When the image requested for display is returned to the user client (e.g., after performing the activities of S505) and the search engine sends out a request for retrieving corresponding annotation content, the annotation parser parses out the annotation content from the auxiliary information of the image and returns the annotation content to the user client or, alternatively, returns the annotation content to the user client through the search engine.

S505: The server reckons the annotation content for the image as a search index which is provided to an image search engine.

In one embodiment, between S503 and S504, additional activities that may be included are described below.

S503': The server examines the annotation content submitted by the user.

An examination at this point includes one or a combination of two of the following meanings: examination of the legitimacy of annotation content and examination for the best annotation content.

In one embodiment, when the server organizes a format of question and answer and a scoring rule for annotation content submission with users providing more annotation contents, the submitted annotation contents may be examined.

As with the first exemplary embodiment, when the server organizes a format of question and answer and a scoring rule for annotation content submission, the following may be used to implement storing the annotation content in a database and associating the annotation content with the image by the server:

storing in the database the best annotation content detected upon scoring and associating the best annotation content with the image by the server.

In one embodiment, the following may be used to implement storing the annotation content into auxiliary information of the image and storing the image by the server:

storing in the auxiliary information of the image the best annotation content detected after scoring and storing the image by the server.

As with the first exemplary embodiment, when the annotation content includes a URL address of the seller of the merchandise, storing the annotation content in the database and associating the annotation content with the image by the server may include:

storing in the database the product information in the web page that is linked by the URL in the annotation content and associating the product information with the image by the server.

In one embodiment, storing the annotation content in the auxiliary information of the image and storing the image by the server may include:

storing in the auxiliary information of the image the product information that is linked by the URL in the annotation content and storing the image by the server.

It is noted that the second exemplary embodiment refers to a specific situation when technologies such as AJAX are used on the one hand, and focuses on a situation when a user provides an answer to a question about an image on the other hand. Particularly for the latter situation, it is evident that the server may have already stored the image because the image may have been previously received by the server (e.g., the image has been uploaded by some user previously) or may be an image on the server. In reality, upon adding annotation content or frame label for the image by the user client, the server only needs to obtain the annotation content for the image and the frame label without repeatedly receiving and storing the image. If the AJAX technology is used in the web page, the user may only send the annotation content and the frame label to the server without repeatedly sending the image to the server.

Figure 6:
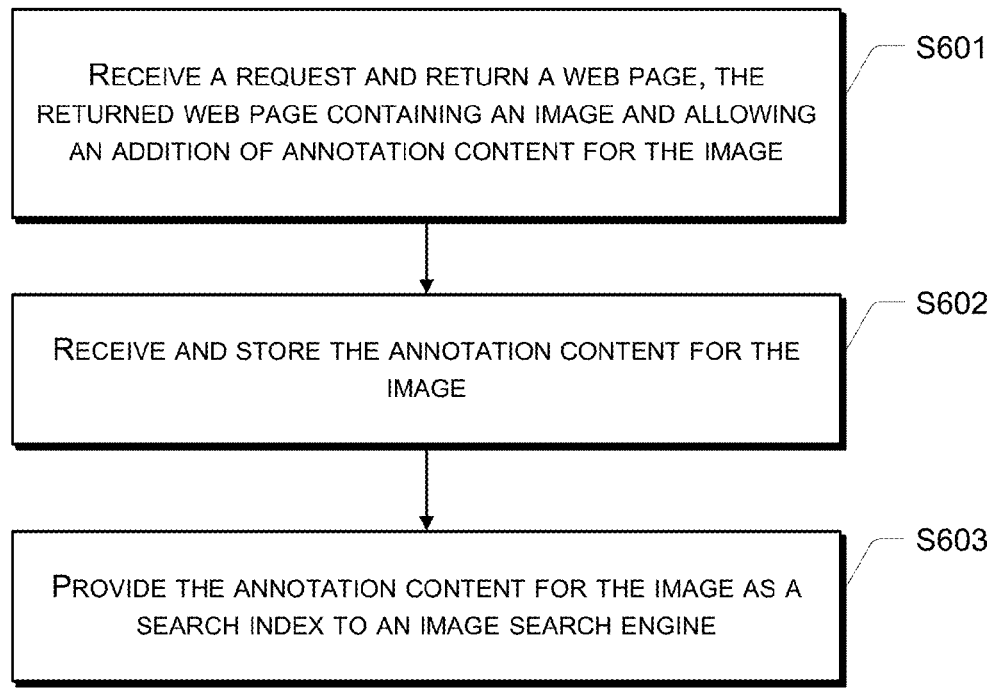
FIG. 6 shows a flow chart of a perspective of a server in accordance with the second exemplary method of the present disclosure.

The second exemplary embodiment is described from the perspective of the server below. FIG. 6 shows a flow chart of such description.

S601: The server receives a request and returns a web page. The returned web page contains an image and allows an addition of annotation content for the image.

In the returned web page, at S601, a client user is permitted to add a frame label for a portion of the image in one embodiment. As such, a user client may add a frame label for an image on a browser using this technology. Specifically, through this technology, the user client is provided with a function of frame labeling for a certain part of the image.

S602: The server receives and stores the annotation content for the image.

A textual input for annotation content may be a description written by the user client related to a merchandise in the image in particular, such as, for example, texture, material, place of production, unit price, function and use of the merchandise, a URL address of an online store of a seller of the merchandise, contact method of the seller and comments for the merchandise, or any combination thereof.

The content of the frame is typically a product (in the image) that is framed by the user client. Within the annotation content of the frame label there may be a description of the product and a URL address of the online store of the seller, for example, as described above.

In one embodiment, if the user client performs frame labeling for the image in the web page and adds annotation content, the annotation content may be added within an annotation box of the frame label.

It should be noted that what the server receives may be an annotation content and a frame label for the image added by a certain user, different annotation contents for the same image submitted by different users, or from the same user in multiple times, for example. Evidently, the latter may further include separately submitting multiple annotation contents and frame labels for the same image in multiple times.

Two implementation methods for storing annotation content for an image by the server are described below.

1. In one embodiment, the server stores the annotation content in a database and associates the annotation content with the image.

2. In another embodiment, the server stores the annotation content in auxiliary information of the image and stores the image.

For example, when the image is in jpg or jpeg format, the server may store the annotation content as user comments in accordance with the Exif specification.

S603: The server reckons the annotation content for the image as a search index and provides the annotation content to an image search engine.

In one embodiment, between S602 and S603, additional activities may include:

S602': The server examines the annotation content submitted by the user.

In one embodiment, the server may organize a format of question and answer and a scoring rule for annotation content submission to facilitate more and better annotation contents provided by user clients.

When the server organizes a format of question and answer and a scoring rule for annotation content submission, the following may be used to implement storing the annotation content in a database and associating the annotation content with the image by the server:

storing in the database the best annotation content detected upon scoring and associating the best annotation content with the image by the server.

In one embodiment, the following may be used to implement storing the annotation content in auxiliary information of the image and storing the image by the server:

storing in the auxiliary information of the image the best annotation content detected after scoring and storing the image by the server.

In one embodiment, when the annotation content includes a URL address of the seller of the merchandise, storing the annotation content in the database and associating the annotation content with the image by the server may include:

storing in the database the product information in the web page that is linked by the URL in the annotation content and associating the product information with the image by the server.

In one embodiment, storing the annotation content in the auxiliary information of the image and storing the image by the server may include:

storing in the auxiliary information of the image the product information that is linked by the URL in the annotation content and storing the image by the server.

Figure 7:
FIG. 7 shows a resulting view obtained upon execution of the first or the second exemplary method in accordance with the present disclosure.

FIG. 7 shows a resulting view that implements the first and the second exemplary methods of the present disclosure. As shown in FIG. 7, upon searching through a search engine, a user can see a cover image of <<I am very busy>> of Jay Chou. The image already has frame labels and annotation contents. One frame label is a frame label of a shirt in the image on which a mouse cursor of the user is placed. The web page technology automatically provides a display of the annotation content. Within the annotation content there is information of that shirt, an icon linked to instant messaging with the seller and a price. Other frame labels can also be seen on the image. When the mouse cursor is placed on other frame labels, the web page technology will automatically provide displays of respective annotation contents. Furthermore, all questions about the image are listed at the bottom of the image. A user who browses this web page may add answers to these questions.

Figure 8:
FIG. 8 shows a resulting view of an image that contains all merchandises on a web page upon execution of the first or the second exemplary method in accordance with the present disclosure.

The image shown in FIG. 7 actually has many frame labels. FIG. 8 shows all annotation contents for merchandises in that image. Each of the annotation contents includes simple information of respective merchandise, a price and an icon that links to instant messaging with respective seller. Upon obtaining the image through a certain keyword search (e.g., a keyword of a certain merchandise), the user may obtain information of multiple merchandises in the image, thus extending likelihood of purchase by the buyer and facilitating more transactions to be concluded.

Figure 9:
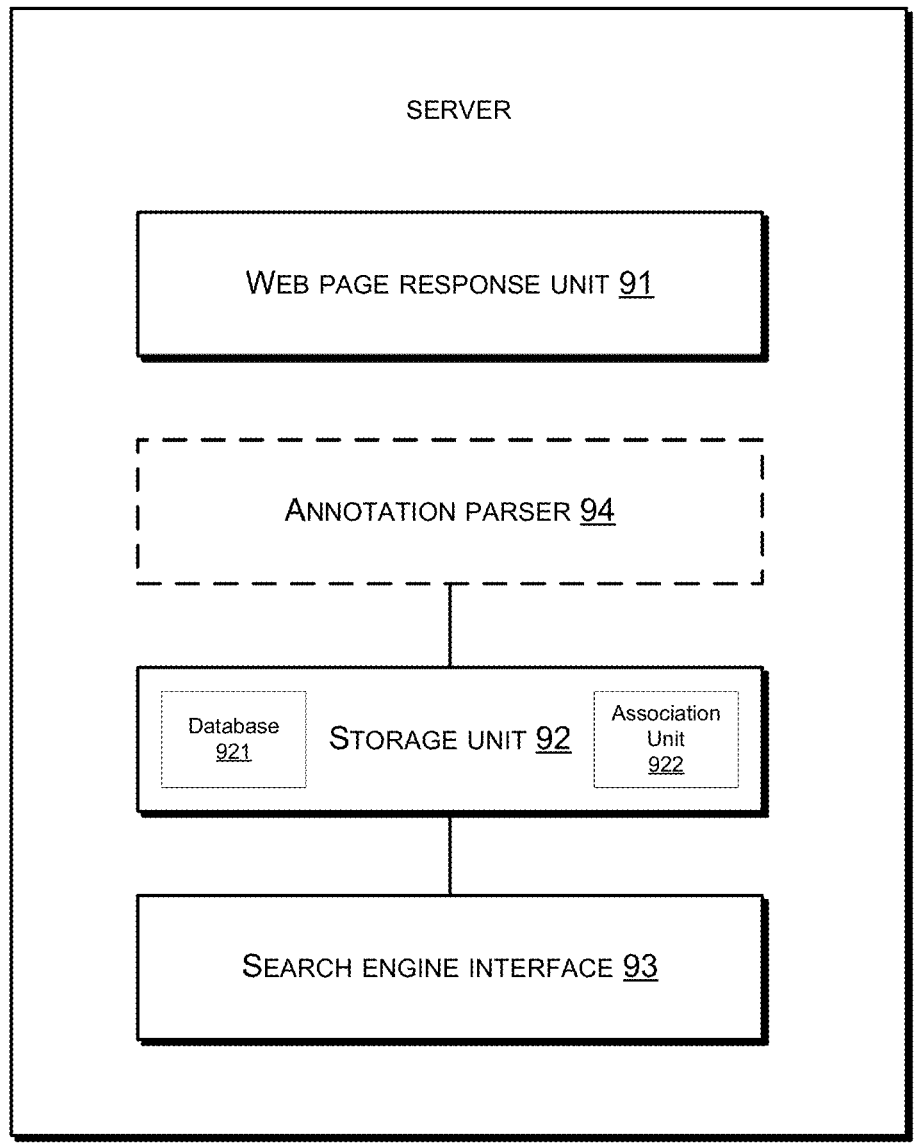
FIG. 9 shows a schematic diagram of a first exemplary server in accordance with the present disclosure.

A first exemplary apparatus that enables image search in accordance with the present disclosure, such as a server, is described below. FIG. 9 shows a schematic diagram of such server according to one embodiment. As shown in FIG. 9, the server includes:

a web page response unit 91, configured to receive a request and return a web page, where the returned web page allows uploading an image and adding annotation content for the image;

a storage unit 92, configured to receive and store the image and the annotation content for the image; and a search engine interface 93, configured to reckon the annotation content for the image to be a search index and provide the annotation content to an image search engine.

In one embodiment, the ability of adding a frame label for part of the image in the returned web page is further allowed.

In one embodiment, the storage unit 92 is further configured to receive and store the frame label that is added for part of the image.

In one embodiment, the storage unit 92 includes a database 921 and an association unit 922. The database 921 stores the annotation content. The association unit 922 associates the annotation content stored in the database with the image corresponding thereto.

In one embodiment, the server further includes an annotation parser 94, which writes the annotation content into auxiliary information of the image.

Correspondingly, the storage unit 92 stores the image that has the auxiliary information having the annotation content.

In one embodiment, upon receiving a request for retrieving the annotation content from the search engine, the annotation parser 94 parses out the annotation content from the auxiliary information of the image and returns the annotation content to the user client, or returns the annotation content to the user client through a search engine.

In one embodiment, the server further includes a best annotation content selection unit, which is configured to select the best annotation content, or the annotation content with the highest score, after scoring when the annotation content satisfies a scoring rule.

Correspondingly, the database 921 stores the best annotation content; and the association unit 922 associates the best annotation content stored in the database 921 with the image.

In one embodiment, the server further includes a URL link parsing unit, which is configured to parse merchandise information on a web page that is linked by a URL in the annotation content.

Correspondingly, the database 921 is further used to store the merchandise information on the web page that is linked by the URL in the annotation content.

In one embodiment, the server further includes a URL link parsing unit, which is configured to parse merchandise information on a web page that is linked by a URL in the annotation content.

Correspondingly, the annotation parser 94 is further configured to write in the auxiliary information of the image the merchandise information on the web page that is linked by the URL in the annotation content.

A method of image search using this server is similar to the first exemplary method described above and is not described repeatedly herein in the interest of brevity.

Figure 10:
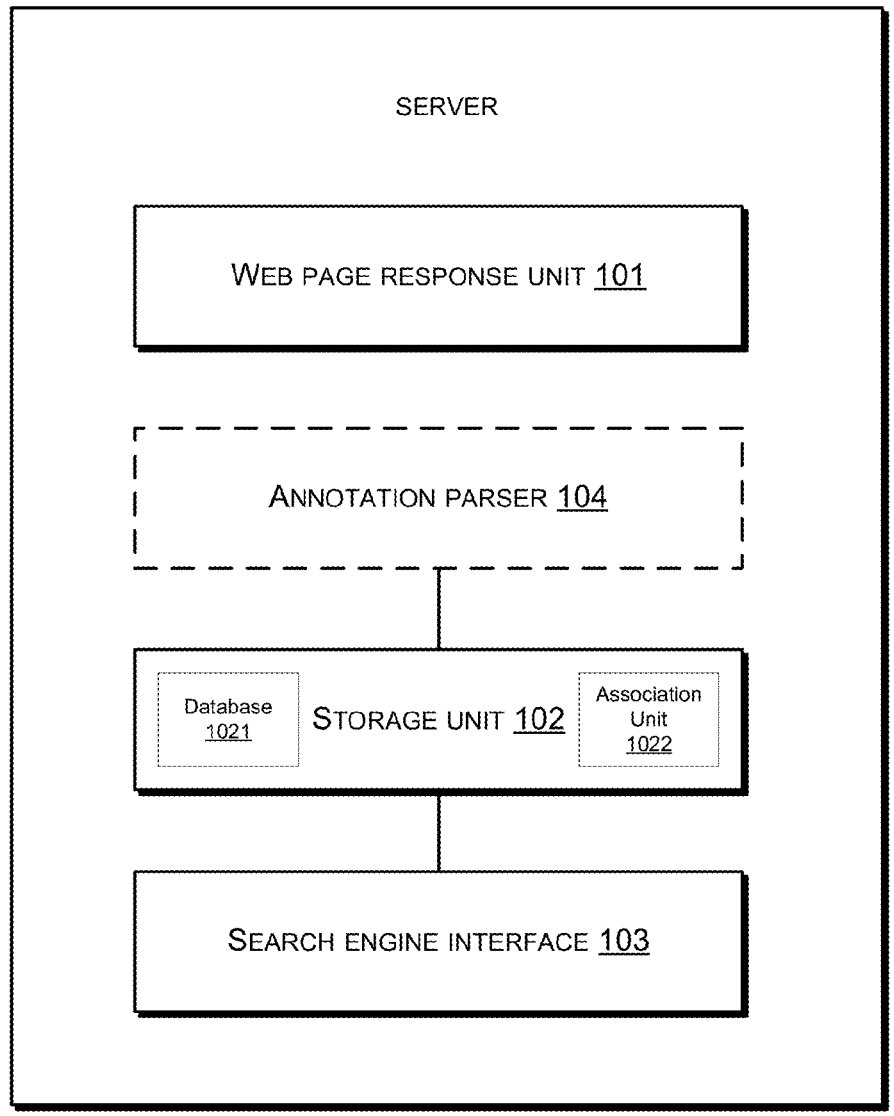
FIG. 10 shows a schematic diagram of a second exemplary server in accordance with the present disclosure.

A second exemplary server of image search in accordance with the present disclosure is described below. FIG. 10 shows a schematic diagram of such apparatus. As shown in FIG. 10, the apparatus includes:

a web page response unit 101, configured to receive a request and return a web page, where the returned web page includes an image and allows an addition of annotation content for the image;

a storage unit 102, configured to receive and store the annotation content for the image; and a search engine interface 103, configured to reckon the annotation content for the image to be a search index which is provided to an image search engine.

In one embodiment, adding a frame label for part of the image in the returned web page is further allowed.

In one embodiment, the storage unit 102 is further used to receive and store the frame label added for part of the image.

In one embodiment, the storage unit 102 includes a database 1021 and an association unit 1022.

The database 1021 is configured to store the annotation content. The association unit 1022 is configured to associate the annotation content stored in the database 1021 with the image corresponding thereto.

In one embodiment, the server further includes an annotation parser 104, which is configured to write the annotation content in auxiliary information of the image.

Correspondingly, the storage unit 102 stores the image that has the auxiliary information having the annotation content.

In one embodiment, upon receiving a request for retrieving the annotation content from the search engine, the annotation parser 104 parses out the annotation content from the auxiliary information of the image and returns the annotation content to the user client, or returns the annotation content to the user client through a search engine.

In one embodiment, the server further includes a best annotation content selection unit, which is configured to select the best annotation content, or the annotation content having the highest score, after scoring when the annotation content satisfies a scoring rule.

Correspondingly, the database 1021 stores the best annotation content; and the association unit 1022 associates the best annotation content stored in the database with the image.

In one embodiment, the server further includes a URL link parsing unit, which is configured to parse merchandise information on a web page that is linked by a URL in the annotation content.

Correspondingly, the database 1021 is further configured to store the merchandise information on the web page that is linked by the URL in the annotation content.

In one embodiment, the server further includes a URL link parsing unit, which is configured to parse merchandise information on a web page that is linked by a URL in the annotation content.

Correspondingly, the annotation parser 104 is further configured to write in the auxiliary information of the image the merchandise information on the web page that is linked by the URL in the annotation content.

A method of image search using this server is similar to the second exemplary method described above and is not described repeatedly herein in the interest of brevity.

As illustrated in the above exemplary embodiments, more information search related to an image is provided regardless of whether the first exemplary embodiment (that the server receives a request and returns a web page that allows uploading an image and adding annotation content for the image, receives and stores the image and the annotation content for the image, and reckons the annotation content for the image to be a search index which is provided to an image search engine) or the second exemplary embodiment (that the server receives a request and returns a web page that includes an image and allows adding annotation content for the image, receives and stores annotation content for the image, and reckons the annotation content for the image to be a search index which is provided to an image search engine) is used. Moreover, because more information related to merchandise in the image can be provided to a viewer, online transactions are better induced.

From the exemplary embodiments described above, one skilled in the art can clearly understand that the disclosed method and apparatus may be implemented using software and universal hardware platform. Based on this understanding, the technical scheme of the present disclosure, or portions contributing to existing technologies, may be implemented in the form of software products which are stored in a storage media such as ROM/RAM, disk and drive. The software includes instructions for a computing device (e.g., personal computer, server or networked device) to execute the method described in various exemplary embodiments or a certain part of the exemplary embodiment of the current disclosure.

The disclosed method and apparatus may be used in an environment or in a configuration of general or specialized computer system(s). Examples include a personal computer, a server computer, a handheld device or a portable device, a tablet device, a multi-processor system, a system based on microprocessor, a set-up box, a programmed customer electronic device, a network PC, a small-scale computer, a large-scale computer, or a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and remote computers.

Though the present disclosure is described using the exemplary embodiments, it is appreciated that a person of ordinary skills in the art can alter or modify the disclosed embodiments in many different ways without departing from the spirit and the scope of this disclosure.

What is claimed is:

1. A computer method implemented by one or more computing devices, the method comprising:
   receiving one or more pieces of textual annotation content for an image from one or more clients, the one or more pieces of textual annotation content comprising at least a link to a web page associated with merchandise corresponding to the image and an icon for initiating an instant messaging session with a seller of the merchandise;
   examining a legitimacy of the textual annotation content, the examining including applying a word filter based on a predetermined word lexicon to filter out illegitimate words;
   storing the one or more pieces of the textual annotation content for the image, wherein the storing the one or more pieces of the textual annotation content includes storing the textual annotation content having a highest score in auxiliary information of the image, wherein the storing the textual annotation content having the highest score in the auxiliary information of the image comprises storing the textual annotation content in a user comments tag in accordance with Exchangeable image file format (Exif) specification, and
   providing the one or more pieces of textual annotation content as search indices for the image to an image search engine; and
   ordering the search indices specifically in the database, including establishing reverse indices, wherein a format of question and answer and a scoring rule are organized for the one or more pieces of textual annotation content and the textual annotation content having the highest score corresponds to an answer receiving a highest score from one or more users.

2. The method of claim 1, further comprising: examining the one or more pieces of textual annotation content for the image submitted by the one or more clients prior to storing the one or more pieces of textual annotation content.

3. The method of claim 1, wherein storing the textual annotation content having the highest score in the database and associating the textual annotation content having the highest score with the image comprises:
   storing in the database merchandise information on the web page that is linked by a Uniform Resource Locator (URL) link of the seller of the merchandise in the textual annotation content and associating the textual annotation content with the image when the textual annotation content includes the URL link, and
   wherein storing the textual annotation content having the highest score in the auxiliary information of the image comprises:
   storing in the auxiliary information of the image the merchandise information on the web page that is linked by the URL link in the textual annotation content; and
   storing the image.

4. The method of claim 1, wherein the one or more pieces of textual annotation content comprises one or more of: texture of the merchandise in the image, material of the merchandise in the image, specification of the merchandise in the image, place of production of the merchandise in the image, unit price of the merchandise in the image, use of the merchandise in the image, a Uniform Resource Locator (URL) address of the seller of the merchandise in the image, a contact method of the seller, or a comment for the merchandise.

5. An apparatus that enables image search, comprising:
   one or more processors;
   computer-readable storage media communicatively connected to the one or more processors;
   a web page response unit stored in the computer-readable media and configured to receive a request from a user client and return a web page in response to the request, the returned web page allowing an image to be uploaded and textual annotation content to be submitted for the image;
   a storage unit communicatively coupled to the one or more processors and configured to:
   receive one or more pieces of textual annotation content for the image from one or more clients, the one or more pieces of textual annotation content comprising at least a link to a web page associated with merchandise corresponding to the image and an icon for initiating an instant messaging session with a seller of the merchandise,
   examine a legitimacy of the textual annotation content, the examining including applying a word filter based on a predetermined word lexicon to filter out illegitimate words, and
   store the one or more pieces of the textual annotation content for the image including storing the textual annotation content having a highest score in auxiliary information of the image, wherein the storing the textual annotation content having the highest score in the auxiliary information of the image comprises storing the textual annotation content in a user comments tag in accordance with Exchangeable image file format (Exif) specification; and
   a search engine interface configured to provide the one or more pieces of textual annotation content as search indices to an image search engine, wherein the database performs a specific ordering of the search indices, including establishing reverse indices, and wherein a format of question and answer and a scoring rule are organized for the one or more pieces of textual annotation content and the textual annotation content having the highest score corresponds to an answer receiving a highest score from one or more users.

6. The apparatus of claim 5, wherein the storage unit comprises: the database; and an association unit, wherein the database is configured to store the textual annotation content, and wherein the association unit is configured to associate the textual annotation content stored in the database with the image corresponding thereto.

7. The apparatus of claim 6, further comprising:
   a best textual annotation content selection unit configured to select the textual annotation content with the highest score after scoring in accordance with the scoring rule, wherein the database stores the textual annotation content with the highest score, and wherein the association unit associates the textual annotation content with the highest score stored in the database with the image.

8. The apparatus of claim 6, further comprising:
   a Uniform Resource Locator (URL) link parsing unit configured to parse merchandise information on the web page that is linked by a URL link in the textual annotation content, wherein the database is further configured to store the merchandise information on the web page that is linked by the URL link in the textual annotation content.

9. The apparatus as recited in claim 6, further comprising:
   a Uniform Resource Locator (URL) link parsing unit configured to parse merchandise information on the web page that is linked by a URL link in the textual annotation content; and an annotation parser configured to write in the auxiliary information of the image the merchandise information on the web page that is linked by the link in the textual annotation content.

10. The apparatus of claim 5, further comprising:
    an annotation parser configured to write the textual annotation content having the highest score into the auxiliary information of the image,
    wherein the storage unit stores the image that has the auxiliary information having the textual annotation content having the highest score.

11. The apparatus of claim 10, wherein upon receiving a request for retrieving the one or more pieces of textual annotation content from the image search engine, the annotation parser parses the textual annotation content having the highest score from the auxiliary information of the image and returns the textual annotation content having the highest score to the user client, or returns the textual annotation content having the highest score to the user client through the image search engine.

12. One or more non-transitory computer-readable media storing instructions, which when executed by one or more processors, cause the one or more processors to perform a method comprising:
    receiving one or more pieces of textual annotation content for an image from one or more clients, the one or more pieces of textual annotation content comprising at least a link to a web page associated with merchandise corresponding to the image and an icon for initiating an instant messaging session with a seller of the merchandise;
    examining a legitimacy of the textual annotation content, the examining including applying a word filter based on a predetermined word lexicon to filter out illegitimate words;
    storing the one or more pieces of textual annotation content for the image, wherein the storing the one or more pieces of textual annotation content includes storing the textual annotation content having a highest score in auxiliary information of the image, wherein the storing the textual annotation content having the highest score in the auxiliary information of the image comprises storing the textual annotation content in a user comments tag in accordance with Exchangeable image file format (Exif) specification; and providing the one or more pieces of textual annotation content as search indices for the image to an image search engine; and ordering the search indices specifically in the database, including establishing reverse indices, wherein a format of question and answer and a scoring rule are organized for the one or more pieces of textual annotation content and the textual annotation content having the highest score corresponds to an answer receiving a highest score from one or more users.

* * * * *